Jan. 5, 1943.  O. F. HUBBS  2,307,372
MOTOR VEHICLE SIGNAL DEVICE
Filed March 8, 1940
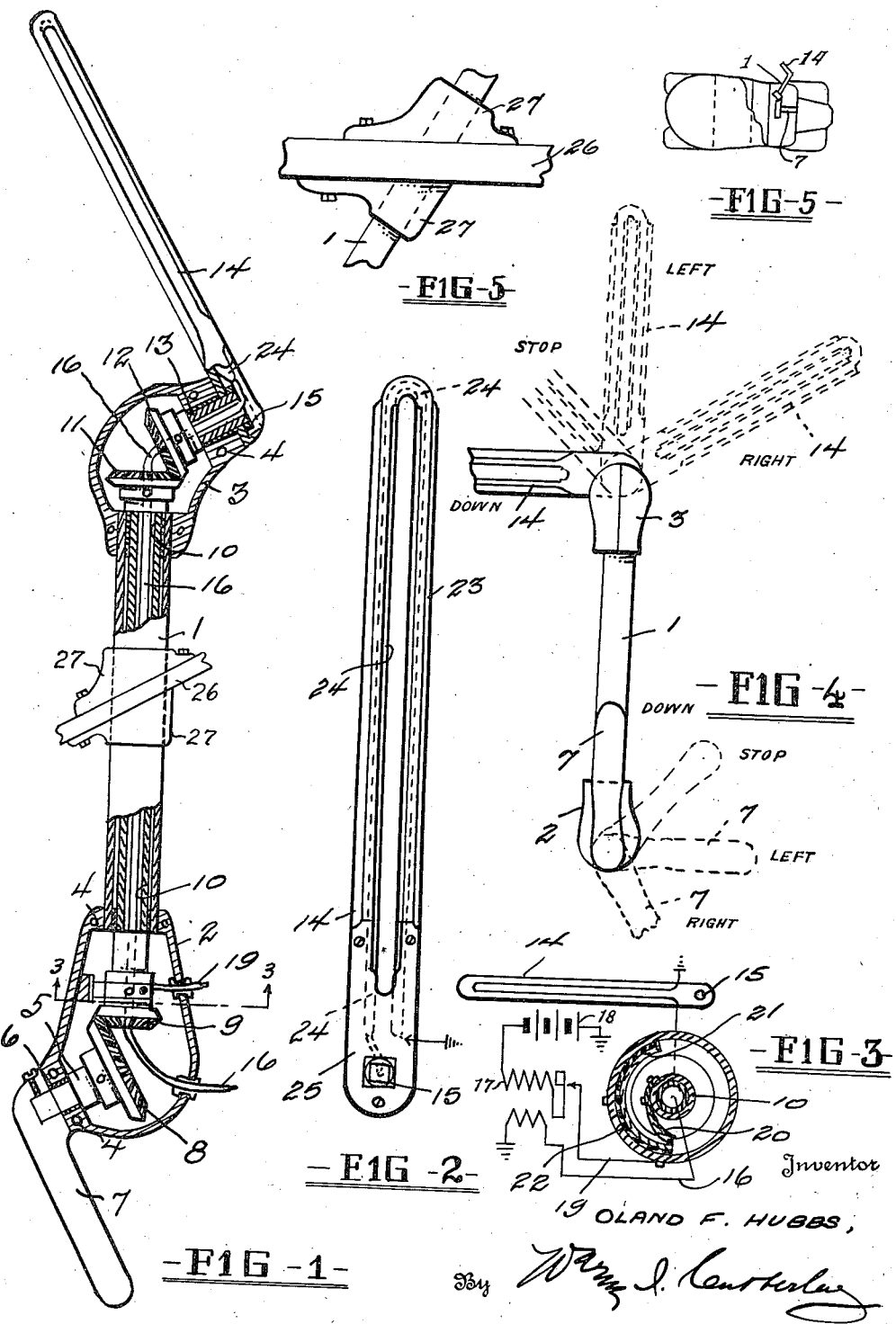

Patented Jan. 5, 1943

2,307,372

UNITED STATES PATENT OFFICE 2,307,372

MOTOR VEHICLE SIGNAL DEVICE

Oland F. Hubbs, Milton, Oreg.

Application March 8, 1940, Serial No. 323,007

1 Claim. (Cl. 177—327)

My present invention, in its broad aspect, has to do with improvements in visual signalling devices for motor vehicles, and more particularly it is my purpose to provide a device of this broad type which uses neon tube illumination, and which is constructed to automatically turn the illumination on or off as the signal is operated, and which will indicate either to a driver approaching the car from the front or rear whether a "right" or "left" turn is contemplated or whether the driver contemplates a "stop." My present invention is designed to be positioned in the forward left hand corner of a vehicle between the door and the windshield, and may be conveniently supported by the left front corner post of the vehicle frame behind the dash board, where it can be conveniently manipulated by the driver of the vehicle. My present invention is adapted for use with trucks, passenger cars or any other type of mobile vehicle.

In practice the neon gas in the tube is energized from the conventional battery, after passing the current from the battery through a vibrator coil to transform it into a high voltage, low amperage output; and in practice I also find that the vibrator coil may be located at any convenient place on the vehicle and ordinarily a blinker is placed between the battery and coil, and a suppressor provided to eliminate any sound emanating from the coil. I have also found that a gold color light is desirable and this is obtained by utilizing a fluorescent green tube with red neon gas; the tube itself is protected by nonshatterable glass such as "Plex-o-glass" or the like and is resiliently mounted in the signalling arm to be visible both from the front and back of the vehicle; furthermore I have found it desirable to chromium plate all of the exposed parts of my device to afford an attractive noncorrosive surface.

The principal objects of my invention, briefly stated are; 1 to give a "left turn" or "right turn" or "stop" signal definitely and quickly, and without distracting the attention of the driver, or interfering with manipulation of the vehicle; 2 to provide a signal which is visible both to one approaching the vehicle either from the front or rear; 3 to provide a signal which will be visible at night or in a fog, and without reliance upon reflectors or the like, and to provide a signal which can be easily operated from within the car without lowering the window or otherwise disturbing air-conditioning mechanism which may be installed in the car; 4 to provide a signal which will maintain the position in which it is placed until positively moved so that the left hand of the driver is free after the signal is once placed; 5 to provide a resilient or cushioned mounting for the neon tube, and 6 to provide a signal which is simple in construction, efficient in operation, has no parts which are likely to become broken or disarranged, and in which parts may be easily replaced (as for instance the neon tube), and which will lend to the appearance of the vehicle and will not be affected by weather and road conditions.

The foregoing and other equally important objects and advantages of my invention will be apparent in greater detail as the description proceeds; but it is desired to emphasize that interpretation of the scope of my invention should only be conclusive when made in the light of the subjoined claim.

In the drawing wherein I have illustrated a preferred form of my invention;

Figure 1 is an assembly side view of my signal device showing parts thereof in section to expose operating parts;

Figure 2 is a top plan view of the signal arm;

Figure 3 is a section on the line 3—3 of Figure 1, and the wiring diagram;

Figure 4 is a diagrammatic view of the positions which are ordinarily assumed by my signalling device, and Figure 5 is a detail of the mounting of my signal device to the frame of the vehicle.

In the drawing wherein like characters of reference are used to designate like or similar parts throughout the several views;

The numeral 1 designates an elongated casing or exterior column, to which are attached the gear housings 2 and 3; which gear housings are in sections attached together by screws or bolts 4 so that they may be taken apart to have access to the parts in the interior thereof.

Mounted on a stub shaft 5 journalled at 6 in one end of the gear housing 2 is a handle 7. Said stub shaft 5 carries a relatively large mitre gear 8 which meshes with a relatively small mitre gear 9 on the hollow operating shaft or column 10 which is mounted and supported for rotation in the elongated exterior column or casing 1. At the remaining end of the operating shaft or column 10 is mounted another mitre gear 11 which meshes with a similar, driven, mitre gear 12 mounted on the stub shaft 13 journalled in the gear housing 3; and on said stub shaft 13 the signal arm 14 is mounted. Preferably the end of the stub shaft 13 is squared to receive the signal arm which is attached by a suitable lock nut 15.

It will be noted that gears 9 and 11 and 12 are formed with openings in their crowns, so that the high voltage wire 16 runs into the housing 2 through the operating shaft or column 10 and out to the signal arm 14 through the gear 12 and stub shaft 13. The high voltage wire is in turn connected to an induction coil 17 which is in circuit with the vehicle battery 18. Attention is called to the fact that instead of the induction coil 17 an induction coil associated with the distributor of the automobile (make and break circuit) may be used. A low voltage wire 19 runs from the induction coil 17 to the switch device mounted on the operating shaft or column 10— see Figure 3. On the column or shaft 10 is a plate spring 20 which contacts a segmental contact plate 21 carried by the gear housing 2 and insulated therefrom as at 22; the contact plate is connected to the low voltage wire 19. As the column moves the plate spring continues contact so long as the signal arm is in operative position as will hereinafter appear.

The signal arm 14 comprises a frame 23 which carries the neon tube 24 there being suitable resilient mountings for the tube so that it will not be injured by vibration and the like; the neon tube is connected to the high voltage wire 16 as shown in Figures 1 and 2, while the other end of the tube is grounded on the frame as indicated in Figure 2. A suitable plate 25 covers the end of the signal arm as shown in Figure 2 so that wire connections and the free ends of the neon tube and the like are protected. All exposed parts are preferably chromium plated, and the neon tube is protected by "Plex-o-glass," or similar material. The tube is preferably 10 mm. fluorescent green, with red emitting neon gas so that a gold color light is emitted thereby.

My signal device is mounted preferably through the left front corner post 26 of the car frame, and suitable journal brackets 27 are provided to firmly mount my device as shown in Figure 5. The handle 7 of my device is handily placed with reference to the driver of the vehicle, and upon moving the handle the signal arm is positioned to show in conventional manner the "left turn" and "right" turn, or "stop" signals as indicated in Figure 4; while movement of the operating shaft or column 10 from the passive to the active positions carries the plate spring to contact position with the contact plate 21, where contact is maintained so long as operative positions are maintained. By reason of the frictional resistance to movement or the inherent capacity of the intermeshing gears 8, 9, 11 and 12 to maintain any given position unless positively moved the signal arm is maintained in any given position having once been moved to that position so that the left hand of the driver is free. In Figure 4 the full line showing of 7 and signal arm 14 indicates the neutral or down position of the same, slight movement of which affects contact and indicates the "stop" position of the signal arm, which is the "down" position of the same; the next dotted line position—at right angles to the body of the vehicle—indicates the "right" turn and is shown in dotted lines, and the upper or substantially vertical position, which is the third position and shown in dotted lines, indicates a "left" turn.

The operation of my device is very simple and efficient. When the driver wishes to indicate what action he intends to take he merely grasps the handle 7 and turns it to position the signal arm 14 in the desired and proper position. As the handle is moved, so also is the operating shaft or column 10 which contacts the spring 20 with the plate 21 grounding the low voltage current, and energizing the neon tube through the high voltage wire 16. When the signal arm is again moved to the passive position the spring is out of contact with the plate; the neon tube deenergized, and the signal arm out of indicating position. The angles shown in Figure 1 between the tube 1 and the handle 7 and signal dispose these parts in the most convenient position for the operator, the signal in the most practical position with reference to the car body, and the tube in the most practical position with reference to both the handle and signal.

While in the foregoing a particular form of my invention has been shown and described, it is emphasized and repeated that interpretation of the scope of my inventive concept should only be conclusive when made in the light of the subjoined claim.

I claim:

A direction signal for vehicles comprising a signal arm having illuminating means, an operating handle therefor, a connecting shaft between the operating handle and the signal arm, said shaft being hollow and having mitre gears at its ends meshing respectively with mitre gears carried on stub shafts connected with said signal arm and handle respectively, the stub shaft connected with the signal arm being hollow and the mitre gear thereon, and the mitre gears on the main shaft having openings therein, electrical connections for the illuminating means on the signal arm extending through said main shaft and through the openings in said mitre gears and the hollow stub shaft, a switch device having contacts on the main shaft to energize the illuminating device when the main shaft is moved, a hollow housing member enclosing the main shaft, and sectional housing members connected with the hollow housing member at the ends thereof and enclosing the mitre gears and stub shafts and forming bearings for the stub shafts, said housing member and sectional housing members forming a protective container for the operative parts of the signal device from which the operating handle and signal arm protrude.

OLAND F. HUBBS.